Sept. 19, 1950

W. E. KOCK 2,522,521

THERMAL TRANSISTOR MICROPHONE

Filed Jan. 14, 1949

INVENTOR
W. E. KOCK
BY Harry C. Hart
ATTORNEY

Patented Sept. 19, 1950

2,522,521

UNITED STATES PATENT OFFICE 2,522,521

THERMAL TRANSISTOR MICROPHONE

Winston E. Kock, Basking Ridge, N. J., assignor to Bell Telephone Laboratories, Incorporated, New York, N. Y., a corporation of New York Application January 14, 1949, Serial No. 70,850

12 Claims. (Cl. 179—121)

This invention relates to novel apparatus and methods for translating mechanical vibrations into electrical variations.

The principal object of the invention is to transform mechanical vibrations such as sound waves into electrical variations in a novel manner.

A related object is to obtain amplification of the transformed electrical variations simultaneously with the transformation.

Another object is to provide an electromechanical transducer which is extremely compact in size and light in weight.

Another object is to provide an electromechanical transducer having a high output power level and a high sensitivity.

The invention utilizes as its central element a three electrode semiconductor amplifier. This element comprises a small block of semiconductor material such as germanium having, in its original form, at least three electrodes electrically coupled thereto, which are termed the emitter electrode, the collector electrode and the base electrode. The emitter and the collector may be point contact electrodes making rectifier contact with the block, while the base electrode may be a plated metal film providing a low resistance contact. The emitter may be biased for conduction in the forward direction, while the collector is biased for conduction in the reverse direction. Application of a signal to the emitter electrode produces a signal-frequency current in the collector and in an external circuit connected thereto which may include a load. By reason of certain phenomena which take place within the block, amplified versions of the voltage, current, and power of the signal appear in the load. The device may take various forms, some of which are described in the following applications for patent:

| Application | Ser. No. | Filing Date |
|---|---|---|
| J. Bardeen-W. H. Brattain | 11,165 | Feb. 26, 1948 |
| Now abandoned in favor of J. Bardeen-W. H. Brattain, continuation in part of the above application | 33,466 | June 17, 1948 |
| J. Bardeen | 11,166 | Feb. 26, 1948 |
| J. N. Shive | 44,241 | Aug. 14, 1948 |
| W. E. Kock-R. L. Wallace, Jr | 45,023 | Aug. 19, 1918 |

The device in all of its forms has received the appellation "Transistor" and will be so designated in the present specification.

Various circuit applications adapting this device to particular uses are described in the following applications for patent:

| Application | Ser. No. | Filing Date |
|---|---|---|
| H. L. Barney-R. C. Mathes, now Patent No. 2,517,960, granted August 8, 1950 | 22,854 | Apr. 23, 1948 |
| H. L. Barney, now Patent 2,486,776, issued November 1, 1949 | 22,276 | Apr. 21, 1948 |
| A. J. Rack, now Patent 2,476,323, issued July 19, 1949 | 27,890 | May 19, 1948 |
| R. L. Wallace, Jr | 45,024 | Aug. 19, 1948 |
| R. L. Wallace, Jr | 64,681 | Dec. 10, 1948 |
| R. L. Hanson, now Patent 2,497,770, issued February 14, 1950 | 67,936 | Dec. 29, 1950 |

The present invention is based on the discovery that, in addition to the properties of amplifying a voltage or current applied to it by way of an emitter electrode in direct mechanical and electrical contact with the semiconductor block, the transistor can also amplify power applied to it in the form of radiant energy, for example, infrared radiation. Accordingly, a minute source of heat rays is mounted close to a heat-sensitive part of a face of the transistor, preferably the face opposite to that on which the collector makes its point contact, but out of mechanical contact with it. This heat source may comprise a short length of resistance wire or a narrow constriction in a conductor which is elsewhere of substantial cross-section, or the like, being brought to a suitable high temperature by an electric current flowing through it. It may be mounted on a vibration-responsive device such as a sound-operated diaphragm, for movement therewith toward and away from the heat sensitive surface. Actuation of the diaphragm, as by voice waves impinging thereon, varies the spacing between the heater and the heat-sensitive surface, and so varies the heat which irradicates the surface in substantial accord with the voice signal or other signal to be reproduced.

It is, of course, well known that certain materials, including rectifier materials, have marked resistance-temperature characteristics, whereby the current flowing in a circuit which includes a block of such material as one of its elements may be varied by application of heat to the block, by irradiation conduction, or otherwise. Such devices, however, are incapable of furnishing amplification of the applied variable heat power. In contradistinction to such devices the present invention furnishes in a load circuit a signal which is an amplified counterpart of the variations of the incident radiation regarded as an input signal.

Without necessary subscription to any particular theory of operation, it is believed that, with materials of the type here contemplated, the intense heating of a small region of the semi-conductor in the neighborhood of the collector electrode results in the ionization of some of the atoms composing this region, thus providing, for each such ionized atom, an electron in the conduction band and a positive hole in the filled band; i. e., two current carriers. These two current carriers move in opposite directions under the influence of electric fields due to the operating bias potentials applied to the electrodes. Each of these movements represents a component of current in an external circuit connected to the electrodes, and these two current components are additive. Thus it results that, for a relatively small movement of the diaphragm, and hence a relatively small change in the radiation incident on the semiconductive body, a relatively large change in the external load current results. The resistance of the collector contact, which is biased in the reverse direction, is high, so that for optimum power transfer the load resistance is also high. The relatively large current changes flowing in the high resistance of the external load represent substantial amounts of signal-frequency power.

The mode of operation of the invention is to this extent believed to be similar to that put forth as an hypothesis in the aforementioned applications of John Bardeen and W. H. Brattain, namely, that at least a part of the mechanism by which the transistor amplifies is to be found in the injection into the semi-conductor material of charges which are of a sign opposite to that of an electrode within whose influence they migrate. In the present invention the thermal generation of mobile charge-pairs replaces the injection of positive charges.

The invention will be fully apprehended from the following detailed description of a preferred embodiment thereof, taken in connection with the appended drawings, in which.

Figure 1:
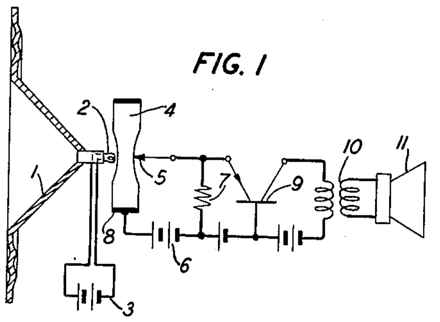
Fig. 1 is a schematic diagram of apparatus embodying the invention.

Referring now to the drawings, Fig. 1 shows a microphone in which a conical diaphragm 1 has affixed to its apex a small loop 2 of resistive wire, which is arranged to be heated by the passage of current through it supplied by a battery 3. The loop 2 of wire is placed in proximity to a transistor disc 4 of germanium or other semiconductor material into the two faces of which have been ground spherical depressions. This germanium disc may be similar to the element of the coaxial type transistor described in the aforementioned joint application of W. E. Kock and R. L. Wallace, Jr. and has in common with that element a contact point 5, commonly called the collector, which is maintained at a negative potential of 40–100 volts by a battery 6 connected, in series with a load resistance 7, to the base terminal of the transistor which, in the example shown, may be a peripheral band 8 of metal. The present structure differs from that described in the aforementioned patent application in that the emitter contact has been removed and the loop 2 of hot wire has been substituted. It has been found experimentally that the presence of the small heated loop 2 in close proximity to the semiconductor surface has a similar effect on the resistance, and therefore the current, of the collector point contact 5. Approaching it toward the semiconductor disc 4 causes a higher current to flow in the collector circuit, and removing it reduces the current. These current changes, flowing through the load resistance 7, result in corresponding voltage drops across the latter. The current in this load resistance, and therefore the voltage across it, can thus be altered or modulated by the variation in proximity of the hot wire 2 to the semiconductor surface. Since it is affixed to the mobile diaphragm 1 which can be actuated by an incident sound wave, the proximity of the hot wire to the semiconductor is varied by the action of a sound wave, and the current through the resistor 7 and the voltage across it likewise exhibit modulations which duplicate the sound variations impinging on the diaphragm 1. This output voltage may be utilized as desired, for example by application to the input terminals of a transistor amplifier 9 whose output may be coupled, for example by way of a transformer 10 to a sound reproducer, such as a loudspeaker 11. The motion of the hot wire 2 can, if preferred, be produced by movements of other sorts, for example by the motion of a needle in a phonograph record. The amplifier and loudspeaker then serve to step up the amplitude of the electrical signal derived from the record. Such a system thus constitutes a record playing device.

Figure 2:
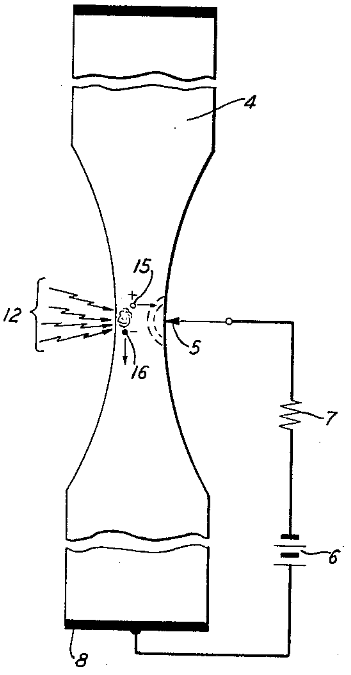
Fig. 2 is a sectional view of a part of Fig. 1, illustrating the manner in which mobile charge pairs are generated by incident radiation.

In Fig. 2, an enlarged section of the semiconducting disc 4 with its collector contact 5 is shown. It is believed that the observed effects, in particular, that the presence of the hot wire 2 of Fig. 1 is equivalent to the emitter contact of a conventional 3-electrode transistor amplifier, are due to thermally ejected current carriers which are drawn toward the collector, thereby reducing the apparent resistance of the collector to germanium circuit. In other words, the hot wire 2 radiates heat waves 12 on the semiconductor surface and raises the temperature of a small volume of the semiconducting material, whose thermal activity is thereby increased. The resulting thermal agitation of the particles of the semiconducting material tends to break apart the positive and negative components of normally neutral charge pairs, allowing the freed positive charge 15 to travel to the collector 5 while the freed negative charges 16 travel to the base 8.

Figure 3:
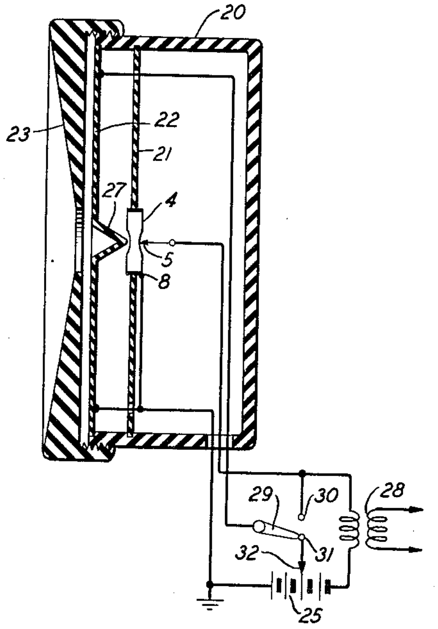
Fig. 3 is a cross-sectional view of a modification of the invention.

Fig. 3 shows a microphone in which the sensitive elements of the invention are protected by enclosure in a casing 20. A disc-shaped or star-shaped supporting member 21, preferably of insulating material, is mounted within the casing and a semiconductive disc 4 which may be similar to that of Figs. 1 and 2 is centrally mounted in this member. A low resistance base electrode 8 surrounds the periphery of the semiconductive disc 4, and a point contact collector electrode 5 engages the center of a recess at one side. Closely adjacent the other side, and in alignment with the collector electrode 5 is a point source of heat which is mounted on and movable with a diaphragm 22. The diaphragm and the heat source are protected by a cover plate 23 having a central opening by way of which the sound waves can impinge on the diaphragm 22.

Figure 4:
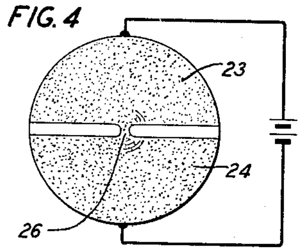
Fig. 4 is an illustrative end view of the diaphragm of Fig. 3.

The diaphragm 22 itself may be constructed of elastic insulating material, the two halves being coated with a conducting material in the form of two semicircular films 23, 24, as indicated in Fig. 4. These two conducting films are supplied with current as by a battery 25. An electrical connection between the two conducting films is made only by way of a narrow constriction 26 at the center of the diaphragm 22. This constriction is of comparatively high resistance and the current density in it is likewise high. It therefore becomes hot and serves as a localized heat source of minute dimensions. To increase its effectiveness in bringing the hot spot near the semiconductive disc 4, a small elevation 27 may be embossed at the center of the diaphragm, as shown in cross-section in Fig. 3. Maximum heat is thus generated at the apex of the boss, which can then be positioned very close to the semi-conductor surface. As before, incidence of sound waves on the diaphragm 22 causes this localized heat source to approach and recede from the surface of the semi-conductor material, thus giving rise to current variations in the output circuit of the device as hereinbefore described. The output circuit may be of any desired type, and is here exemplified by a transformer 28.

A suitable value for the bias potential on the collector electrode of a transistor is of the order of 40 volts negative. By selection of the material and dimensions of the constriction 26 a diaphragm of this construction may be designed to operate satisfactorily when the potential of the energizing battery 25 is of the order of 40 volts. This offers advantages because a single battery 25 can thus serve both as a source of current for the diaphragm heater 26 and of the bias for the collector electrode 5. This arrangement is indicated in Fig. 3 by the switch 29. Throwing this switch to the upper terminal 30 places the full voltage of the battery 25 across the two conducting films 23, 24 and therefore the greater part of it across the narrow constriction 26. At the same time, this battery serves as a polarizing potential for the collector electrode 5, thus replacing the battery 6 of Fig. 1. When the switch 29 is thrown to the lower terminal 31 a lesser voltage, which may be adjusted in magnitude by a movable tap 32, is applied to the heater, the full battery voltage being applied to the collector 5.

Various alternative constructions will occur to those skilled in the art.

What is claimed is:

1. A microphone which comprises a block of semiconductor material having two oppositely located faces, an electrode making point contact with one of said faces, another electrode making low resistance contact with the body of the block, an external circuit including a load and a potential source interconnecting said electrodes, said source being poled to bias the point contact electrode in the reverse direction, a sound-operated diaphragm disposed adjacent the other of said faces, and a heater element mounted on and movable with said diaphragm in a direction substantially normal to said last-named face and in alignment with said point-contact electrode.

2. An electromechanical transducer which comprises a block of semiconductor material having two oppositely located faces, an electrode making point contact with one of said faces, another electrode making low resistance contact with the body of the block, an external circuit including a load and a potential source interconnecting said electrodes, a vibratile member disposed adjacent the other of said faces, and a heater element mounted on and movable with said member in a direction substantially normal to said last-named face and in alignment with said point-contact electrode.

3. An electromechanical transducer which comprises a block of semiconductor material, an electrode making point contact with said block, a concentrated heat source movably disposed adjacent said block, and signal-operated means for varying the spacing of said heat source from said block.

4. An electromechanical transducer which comprises a block of semiconductor material having at least two faces, an electrode making point contact with one of said faces, another electrode making low resistance contact with the body of the block, an external circuit including a load and a potential source interconnecting said electrodes, a concentrated heat source movably disposed adjacent another of said faces, and means for varying the proximity of said heat source to said block under control of a signal.

5. A microphone which comprises a flexible diaphragm having one face of insulating material, a pair of films of conductive material separately fixed to said face, a high resistance conductor interconnecting said films, a source of current having its terminals connected to said films, respectively, and a heat-sensitive member disposed close to but out of contact with said conductor.

6. A microphone which comprises a flexible diaphragm having one face of insulating material, a pair of films of conductive material separately fixed to said face, a high resistance conductor fixed to said member and interconnecting said films, a source of current having its terminals connected to said films, respectively, and a heat-sensitive member closely spaced from said conductor, said heat-sensitive member comprising a block of semiconductor material, an electrode making point contact with said block, another electrode making low resistance contact with said block, and an external circuit including a load and a potential source interconnecting said electrodes.

7. A microphone which comprises a flexible diaphragm having one face of insulating material bearing a central boss, a pair of films of conductive material separately fixed to said face, a high resistance conductor fixed to the apex of said boss and interconnecting said films, a source of current having its terminals connected to said films, respectively, and a heat-sensitive member closely spaced from said conductor.

8. A microphone which comprises a flexible diaphragm having one face of insulating material, a pair of large-area films of conductive material separately fixed to said face, and a narrow neck of the same conductive material interconnecting said films, a source of current having its terminals connected to said films, respectively, and a heat-sensitive member closely spaced from said conductor.

9. An electromechanical transducer which comprises a body of semiconductive material, an electrode making rectifier contact with said body, a heat source movably disposed adjacent said body, and signal operated means for varying the spacing of said heat source from said body.

10. An electromechanical transducer which comprises a block of semiconductive material, an electrode in contact with said block, biasing means for establishing a reverse-direction rectifier junction between said electrode and the body of said block, a heat source movably disposed adjacent said block, and signal operated means for varying the spacing of said heat source from said block.

11. A transducer as defined in claim 10, wherein the material of the semiconductive block is germanium.

12. A transducer as defined in claim 3, wherein the material of the semiconductor block is germanium.

WINSTON E. KOCK.

REFERENCES CITED

The following references are of record in the file of this patent:

UNITED STATES PATENTS

| Number | Name | Date |
|---|---|---|
| 1,492,919 | Hutchinson | May 6, 1924 |

OTHER REFERENCES

Electronics, pages 68–71, Sept. 1948.
Tele-Tech, pages 18–20 and 60, Aug. 1928.